United States Patent [19]
Hollander

[11] Patent Number: 6,039,192
[45] Date of Patent: Mar. 21, 2000

[54] STORAGE SHELF SYSTEM HAVING SHELF MEMBERS WITH SECURING ELEMENTS ENGAGING CUTOUTS AT HORIZONTAL BARS

[75] Inventor: Rudolf Richard Hollander, Vorden, Netherlands

[73] Assignee: NEDCON Magazijninrichting B. V., Germany

[21] Appl. No.: 08/980,502

[22] Filed: Dec. 1, 1997

[30] Foreign Application Priority Data

Jun. 3, 1997 [EP] European Pat. Off. .............. 97108859

[51] Int. Cl.[7] ................................................. A47B 43/00
[52] U.S. Cl. ............................................. 211/186; 211/187
[58] Field of Search .................................. 211/186, 151, 211/187; 403/329

[56] References Cited

U.S. PATENT DOCUMENTS

| | | | |
|---|---|---|---|
| 1,739,730 | 12/1929 | Orthwine | 211/184 X |
| 2,531,911 | 11/1950 | Johnson . | |
| 4,359,947 | 11/1982 | Marschak | 211/186 X |
| 4,665,838 | 5/1987 | Minshall | 211/186 X |
| 4,955,490 | 9/1990 | Schafer | 211/187 |
| 5,279,431 | 1/1994 | Highsmith et al. . | |
| 5,390,802 | 2/1995 | Pappagallo et al. | 211/187 X |
| 5,588,541 | 12/1996 | Goetz | 211/186 X |
| 5,628,415 | 5/1997 | Mulholland | 211/186 X |
| 5,653,550 | 8/1997 | Mutz et al. | 403/329 |

FOREIGN PATENT DOCUMENTS

| | | |
|---|---|---|
| 0273345 | 7/1988 | European Pat. Off. . |
| 8813548 | 4/1989 | Germany . |
| 3836737 | 5/1990 | Germany . |
| 9010342 | 10/1990 | Germany . |
| 4121682 | 1/1993 | Germany . |
| 2951211 | 7/1995 | Germany . |
| 2961474 | 8/1996 | Germany . |
| 2174783 | 4/1986 | United Kingdom . |

*Primary Examiner*—David M. Purol
*Assistant Examiner*—Gregory J. Strimbu
*Attorney, Agent, or Firm*—Robert W. Becker & Associates

[57] ABSTRACT

A storage shelf system includes vertical supports and spacedapart, parallel horizontal bars connecting the vertical supports. Horizontal shelf members extend perpendicularly to the horizontal bars and are fastened with their first and second end portions to the spaced-apart, parallel horizontal bars. The horizontal shelf members provide support surfaces for goods to be stored in the shelf system. The horizontal bars have cutouts. The horizontal shelf members have securing elements engaging the cutouts for securing the horizontal shelf members to the horizontal bars.

7 Claims, 3 Drawing Sheets

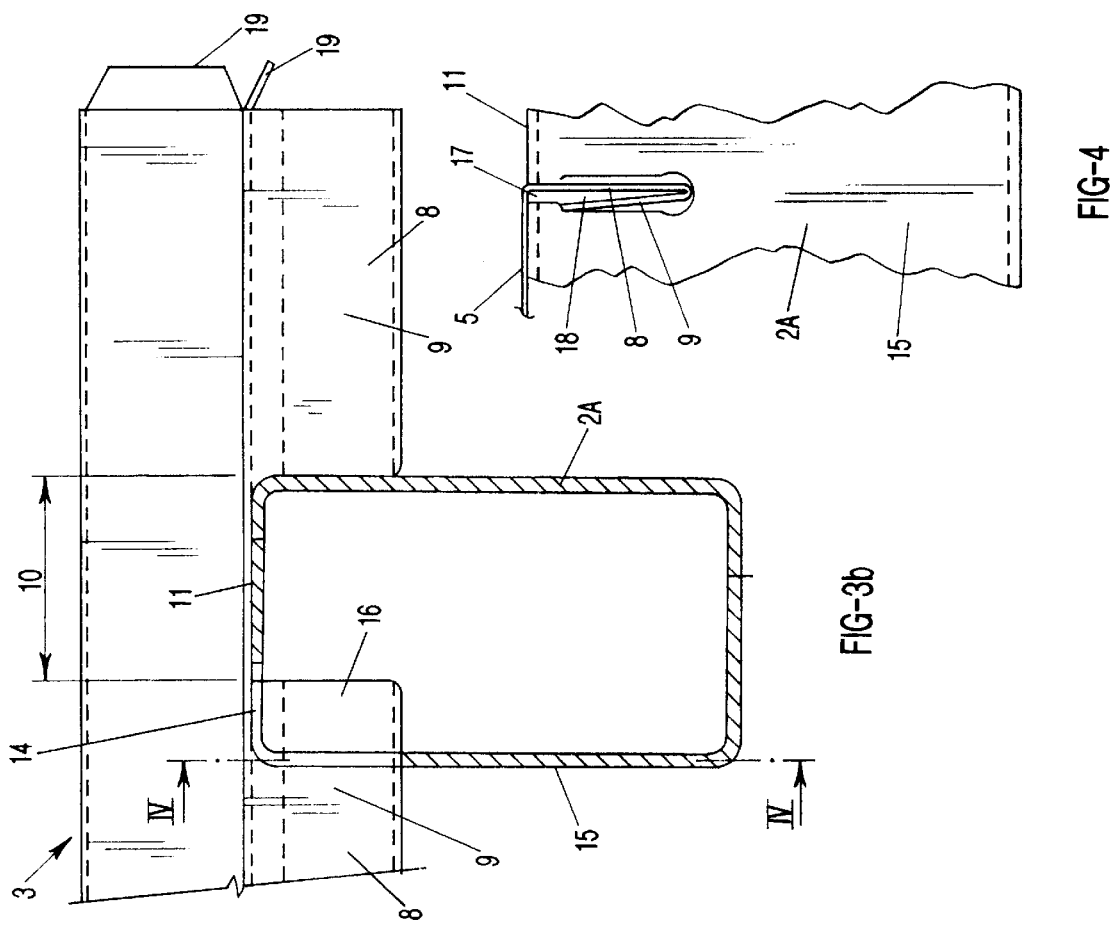
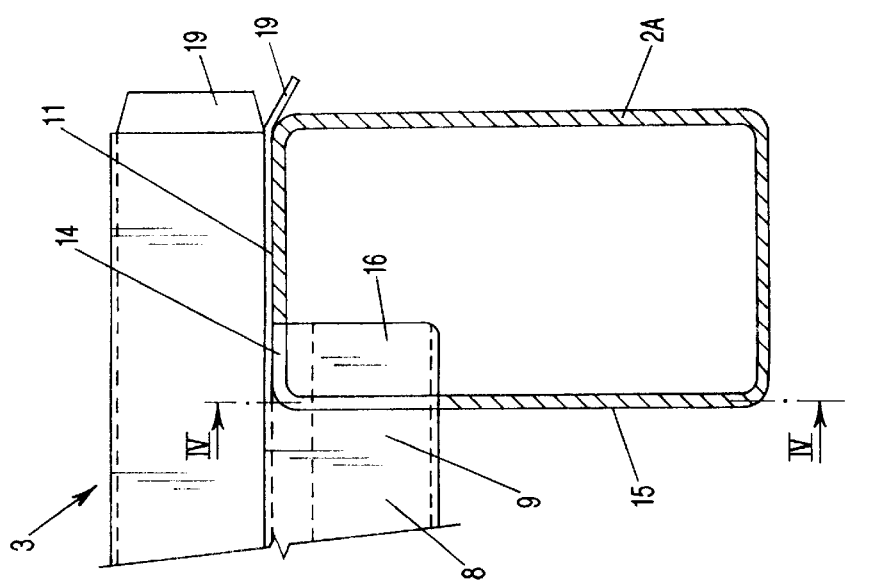

STORAGE SHELF SYSTEM HAVING SHELF MEMBERS WITH SECURING ELEMENTS ENGAGING CUTOUTS AT HORIZONTAL BARS

BACKGROUND OF THE INVENTION

The present invention relates to a storage shelf system with vertical supports and horizontal bars that connect the vertical supports and provide a supporting action for horizontal shelf members extending transverse to the horizontal bars and attached with their ends to front and rear horizontal bars. The horizontal shelf members, consisting of profiled members, support the goods to be stored on their support surfaces and extend in the direction of the depth of the shelf system. These horizontal shelf members include elements for attaching and securing the horizontal shelf members to the horizontal bars.

Such shelf systems are conventionally used in large storage facilities with automatic, computer-controlled placement into storage and removal from storage of various goods. These goods are, in general, in the form of standardized containers or pallets. The shelf system is divided into a plurality of horizontally and vertically arranged compartments which extend to a certain depth in order to accommodate in each compartment a plurality of the aforedescribed goods. When placing into storage or removing from storage, the goods must be moved along the length of the compartment (depth of the shelf) for which purpose a support surface for the goods must extend into the direction of the depth of the shelf system. This support surface must at least engage below the longitudinal edges of the goods to be transported and should guide the goods to be transported during movement in order to prevent canting of the goods within the compartment.

A known shelf system for storage purposes with the aforementioned features is comprised of a system of vertical supports to which are connected horizontal bars in order to define the individual compartments, respectively, their height. The horizontal bars extend along the front and rear side of the shelf system and serve, in addition to forming a truss system with the vertical supports, to also support shelf members which extend at a right angle to the horizontal bars into the depth of the shelf system. The horizontal shelf members serve as a goods support surface and have respectively at least one support surface for vertically supporting the goods to be stored as well as additional guide surfaces for laterally guiding the goods. The horizontal shelf members are shaped as elongate angled profiled members and are arranged in pairs for each row of goods, i.e., the supported goods rest with their opposed longitudinal edges on two adjacent shelf members. However, it is also possible to shape the shelf members symmetrically so that they support simultaneously the longitudinal edge of one row of goods as well as the longitudinal edge of a neighboring row of goods. This reduces the number of required shelf members by half.

For attaching the shelf members, their forward and rearward ends are connected to a front horizontal support and a rear horizontal bar by screws. These mounting steps, since they have to be performed separately for each individual shelf member, are very time-consuming and contribute to about 40% of the costs of such storage systems.

A storage system that can be much more easily installed is known from German Gebrauchsmusterschrift 296 14 743. This shelf system uses shelf members which for installation of the shelf system must only be placed into cutouts at the forward and rearward horizontal bars. However, a lateral fixation in the longitudinal direction of the horizontal bars is not present so that the shelf members can be accidentally moved to some extent. Since between two vertical supports seven to ten shelf members are arranged, such positioning errors can result in deviations in the horizontal bar direction in the amount of a centimeter, even when the shelf members are very precisely manufactured. In modern shelf systems these deviations may result in difficulties for loading and unloading goods with the commonly used precisely operating transporting and loading devices.

For securing the shelf members in the longitudinal direction of the horizontal bars, it is suggested in German Gebrauchsmusterschrift 295 12 116 to attach profiled members which form the shelf members directly or via additional support bars at the horizontal bars. The support bars, which are comprised of plastic, are arranged in the longitudinal direction of the horizontal beams and are provided with securing elements that extend at a right angle to the horizontal bars and project into the ends of the profiled members in order to secure them in the longitudinal direction of the horizontal bars. A disadvantage of this design is the requirement for additional fastening or attachment elements in the shape of support bars made of plastic to be inserted into the horizontal bars. The expenditure for installation of the shelf system cannot be reduced with this solution.

It is therefore an object of the present invention to provide a storage shelf system having a construction that in comparison to known storage shelf systems is loadable to the same extent but requires a reduced installation expenditure.

SUMMARY OF THE INVENTION

The storage shelf system according to the present invention is primarily characterized by:

Vertical supports;

Spaced-apart, parallel horizontal bars connecting the vertical supports;

Horizontal shelf members extending perpendicularly to the horizontal bars and fastened with a first and a second end portions to the spaced-apart parallel horizontal bars;

The horizontal shelf members having a longitudinal extension in the direction of depth of the shelf system;

The horizontal shelf members providing support surfaces for goods to be stored in the shelf system;

The horizontal bars having cutouts;

The horizontal shelf members having securing elements engaging the cutouts for securing the horizontal shelf members at the horizontal bars.

The cutouts are slots extending perpendicularly to a longitudinal extension of the horizontal bars.

The slots preferably extend in the top side of the horizontal bars and in the lateral side of the horizontal bars which is facing the horizontal shelf member.

The slots preferably extend from the top side to the edge, where the top side and the lateral side meet, into the lateral side wherein the length of the slot within the top side is less than the width of the top side and wherein the length of the slot in the lateral side is less than the height of the lateral side.

Advantageously, a slot portion within the lateral side has an upper end and a lower end, wherein the lower end is wider than the upper end, wherein the securing elements include spring elements that snap into the lower end.

The horizontal shelf members have downwardly extending side portions and the securing elements are provided by opposed ends of the side portions.

Preferably, the side portions include an upwardly bent section forming the spring elements.

The side portions preferably form longitudinal edges of the horizontal shelf members and increase bending and torsional stiffness of the horizontal shelf members.

Advantageously, the free ends of the end portions of the horizontal shelf members are without such side portions and the free ends rest face-to-face on the top side of the horizontal bars.

At least one of the end portions of the horizontal shelf members has slanted guide projections.

According to the present invention, it is suggested to provide cutouts at the horizontal bars for attaching the shelf members at the horizontal bars and securing them in the longitudinal direction of the horizontal bars whereby the shelf members have securing elements engaging the cutouts at the horizontal bars.

A shelf system according to the invention is advantageous because, in comparison to known systems, it provides a shelf system that can be loaded to the same extent as prior art shelf systems but requires only a reduced installation expenditure. The securing in the longitudinal direction of the horizontal bars is realized by the cutouts in the horizontal bars and by the securing elements engaging the cutouts which are provided at the shelf members. Additional fastening steps such as screwing or riveting are not required so that substantially reduced installation times result. Especially, it is possible to insert the individual shelf members from one side into the shelf system for securing it. It is no longer necessary to provide separate installation scaffolding as well as safety measures for the installation personnel on the rear side of the shelf system when, for attachment of the rearward end portion of the shelf member, they must climb into the shelf system. When mounting the inventive shelf system, it is sufficient to provide a moveable lift in front of the shelf system in order to allow the installation personnel to insert the shelf member from the front side into the shelf system and to attach it at the provided locations.

In one preferred embodiment it is suggested that the cutouts are slots which extend transverse to the longitudinal direction of the horizontal bars. Preferably, the slots extend in the top side and in the lateral side of the horizontal bar which lateral side is facing the shelf member. In this case, the slot may extend through the edge, where the top side and the lateral side of the horizontal bar meet one another. The extension of the slot portion within the top side is smaller than the width of the top side and the extension of the slot portion in the lateral surface is smaller than the height of the lateral surface. The arrangement of the slots in the horizontal bars accordingly does not result in any weakening of the stability of the horizontal bars.

Since the shelf members are neither screwed nor riveted to the horizontal bars, it may be possible in rare situations that the shelf members will lift off the horizontal bars. In order to prevent this, it is suggested with one embodiment of the present invention that the slot portion within the lateral side of the horizontal bar facing the shelf member be provided with an upper end and a lower end whereby the upper end is narrow and the lower end is widened relative to the upper end. The securing elements at the shelf member then should include spring elements which can be snapped into the lower widened end in order to secure the shelf member within the slot. Thus, the shelf members are secured against movement in the vertical direction because the spring elements are secured (caught) below the narrow upper end by snapping into the widened end, i.e., the spring elements are compressed while passing through the narrow end and will return into the relaxed position when reaching the lower end. The individual shelf members can thus be snapped into the horizontal bars and can thus be locked. This is especially advantageous when mounting the shelf member at the rear side of the shelf system. The installation personnel simply picks up the shelf member and slides it into the shelf system to such an extent until they rearward end of the shelf member rests on the rear horizontal bar. By gravity or by applying a slight pressure onto the shelf member, the shelf member automatically snaps into the rear horizontal bar. Subsequently, the installation personnel presses the forward end of the shelf member into the front horizontal bar so that the entire shelf member is securely snapped into position.

For producing the shelf member in an especially inexpensive manner as a unitary profiled member, it is suggested that the securing elements of the shelf member are provided in the form of the opposed ends of the downwardly extending side portions, i.e., their forward and rearward ends. The securing elements in this embodiment are therefore a unitary part of the shelf member whereby for simplifying the shelf member further, the downwardly extending side portions have an upwardly bent section, bent by approximately 180°, which serves as the spring element for securing the shelf member.

In order to be able to realize all of the aforedescribed details of the shelf member with a single continuous profiled member, the downwardly extending side portions may also provide the longitudinal edge of the shelf member and may in this manner stiffen the entire shelf member in respect to bending and torsional stability.

When placing on or removing goods or from the shelf members, it is advantageous when the respective surfaces on which the goods rest extend over the entire length of the shelf member as a smooth surface without edges or steps. In a further advantageous embodiment it is suggested that the downwardly extending side portions extend over only a portion of the total length of the shelf member and that the length of the shelf member along which such downwardly extending side portion is missing, rests face-to-face on the top side of the horizontal bar. In this manner, in the direction of depth of the shelf system a smooth, continuous support surface is provided.

Finally, it is suggested that the shelf member at least at one end face is provided with unitarily formed slanted guide projections in order to facilitate machine-effected insertion of the goods, respectively, in order to prevent damage of the goods at the sharp edges when placed onto the shelf system.

BRIEF DESCRIPTION OF THE DRAWINGS

The object and advantages of the present invention will appear more clearly from the following specification in conjunction with the accompanying drawings, in which:

FIG. 3a is a sectional view of the horizontal bar and the shelf member in the embodiment according to FIG. 2;

FIG. 3b is a sectional view of the horizontal bar and the shelf member in another embodiment different from FIG. 3a;

FIG. 4 is a sectional representation in the plane IV—IV of FIG. 3a and/or 3b.

DESCRIPTION OF PREFERRED EMBODIMENTS

The present invention will now be described in detail with the aid of several specific embodiments utilizing FIGS. 1 through 4.

Figure 1:
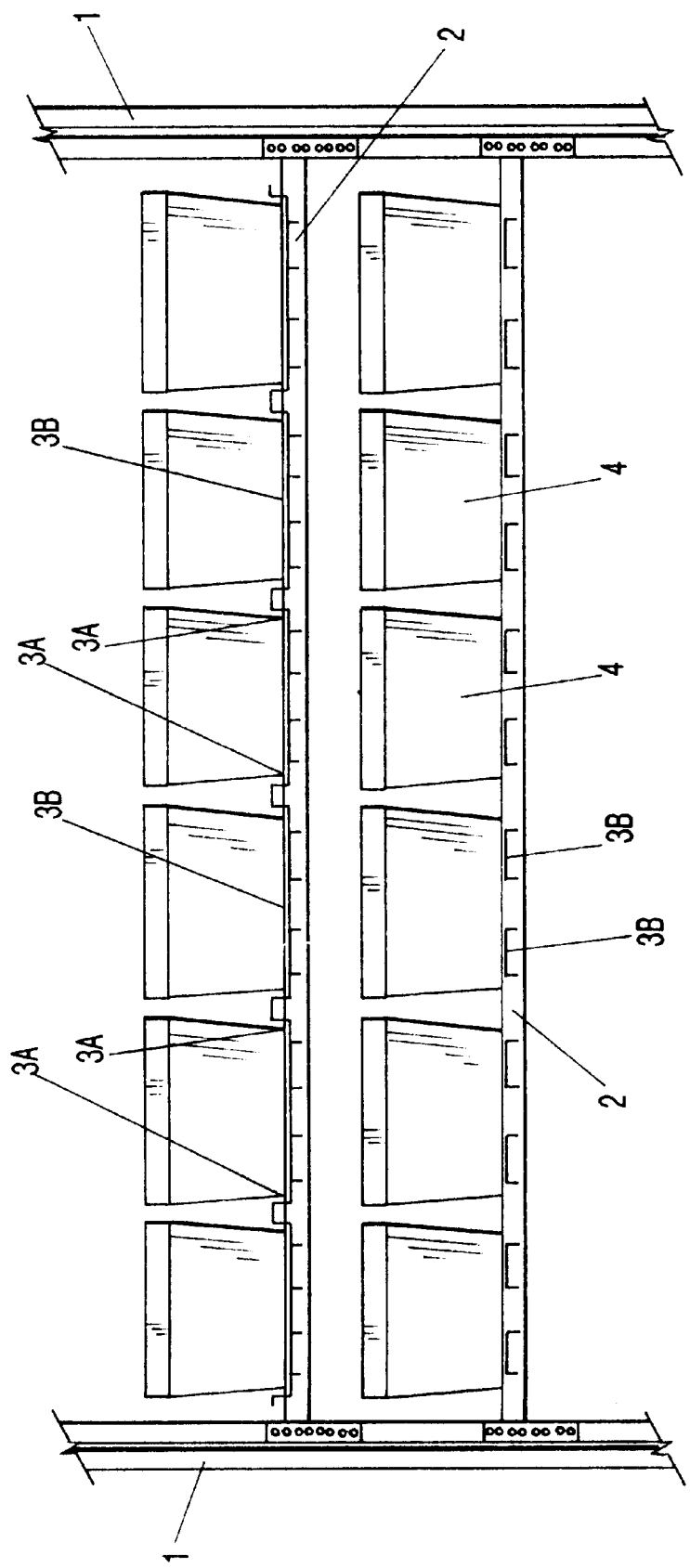
FIG. 1 is a front view of horizontally and vertically arranged compartments of a shelf system for a storage facility with shelf members arranged thereat and with containers placed onto the shelf members.

FIG. 1 shows only a small portion of a large shelf system for storage facilities. Such shelf systems, depending on the respective height of each compartment, can be as tall as a 20 story building or even taller. The base structure of the shelf system is comprised of vertical supports 1 and horizontal bars 2 which connect the supports 1 to one another and which provide the necessary stability to the entire system in the manner of a truss system. The horizontal bars 2 are preferably screwed to the vertical supports 1. Shelf members 3 in the form of elongate profiled members are placed onto the horizontal bars 2. In the embodiment according to FIG. 1 the length of the horizontal bars 2 is such that there is enough space for a total of six parallel extending compartments. In the compartments the goods are stored and rest on the shelf members 3. These good are, for example, plastic containers 4, as shown, as they are used for consignment purposes.

It can also be taken from FIG. 1 that the shelf members 3 are profiled members which extend in the direction of the depth of the shelf system, whereby their cross-sectional design may vary. FIG. 1 shows in the upper rows two different types of shelf members. Flat shelf members 3B support the plastic containers 4 at their center, while shelf members 3A in the basic design of a sigma provide lateral support as well as lateral guidance for the plastic containers 4. In contrast, the plastic containers 4 in the lower rows of FIG. 1 are exclusively supported by shelf member 3B of the flat type. Accordingly, this embodiment does not have raised portions at the shelf members which would be suitable to laterally guide the plastic containers 4. The further explanation of the embodiment refers exclusively to the type 3A of the shelf members; however, it must be realized that the same design features also apply to the type 3B.

Figure 2:
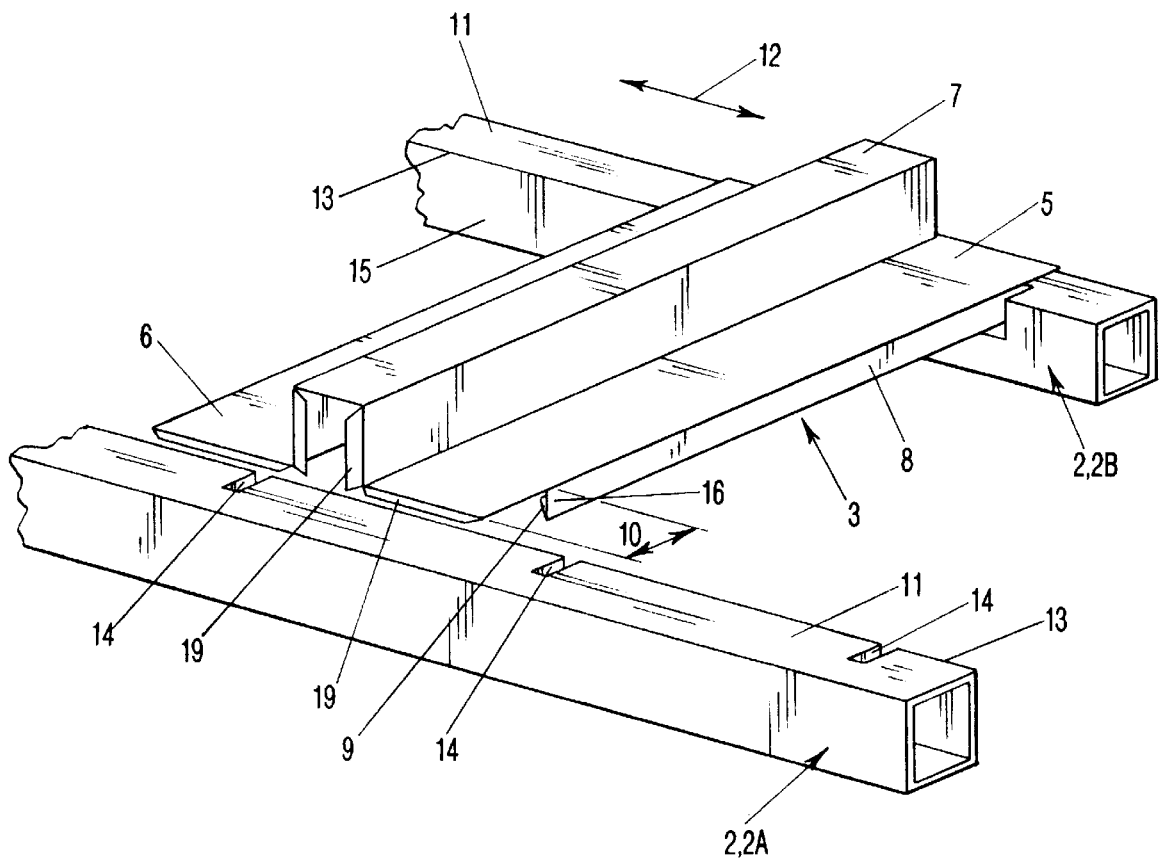
FIG. 2 is a perspective, part-sectional view of the connection between the horizontal bars of the shelf system and the shelf members resting thereon in the form of elongate profiled members.

FIG. 2 shows in a perspective representation the forward and rearward horizontal bars 2A and 2B as well as a shelf member 3. The shelf member 3 is comprised of a profiled member having support surfaces 5, 6 for neighboring plastic containers, i.e., positioned in different compartments. By bending the profiled member during its manufacture multiple times at an angle, the two support surfaces 5, 6 are connected by a raised portion 7 to one another. The raised portion 7 provides on either side the guide surfaces for the stored goods positioned on the surfaces 5, 6.

The length of the shelf member 3 can vary depending on the type of storage facility. In general, the shelf members can support two or three plastic containers behind one another, i.e., in the direction of the depth of the shelf system.

The shelf member 3 is a sheet metal member that is produced by multiple bending at an angle and thus forms a unitary profiled member. It comprises a plurality of portions which will be explained in the following.

The surfaces 5, 6 which extend horizontally are the support surfaces for the goods and are positioned on either side of the raised portion 7 that provides lateral guiding for the goods. Along both longitudinal edges of the shelf member 3 a downwardly extending side portion 8 is provided which extends at an angle of 90° to the surfaces 5, 6 and which thus provides the longitudinal edges of the shelf member 3 and stiffens the shelf member 3 with respect to bending and torsion. The downwardly extending side portions 8 have an upwardly bent section 9 which is bent at an angle of almost 180° in the upward direction and which forms the spring element of the securing elements of the shelf member 3.

The upwardly bent sections 9, which additional stiffen the shelf member 3, are narrower than the downwardly extending side portions 8. FIG. 2 also shows that the downwardly extending side portion 8 with its bent sections 9 extends only over a portion of the length of the surfaces 5, 6. Each free end 10 of the surfaces 5, 6 along which such downwardly extending side portion 8 with its bent section 9 is missing, is resting on the top side 11 of the horizontal bar 2, 2A, 2B.

The first task of the downwardly extending side portion 8 and of the bent section 9 is, as disclosed above, stiffening the shelf member 3. A further task of this portion is to secure the shelf member 3 at the horizontal bar 2 so that the shelf member 3 cannot be moved in the longitudinal direction (see arrow 12) of the horizontal bar. Finally, the side portion 8 and the bent section 9 also serve to secure the shelf member 3 in its longitudinal direction.

For realizing the aforementioned second and third tasks, the horizontal bars 2, which in the shown embodiment are square hollow tubes, are provided with cutouts in the shape of slots 14 at the edge 13 facing the shelf members 3. The slots 14 extend respectively on either side of the edge 13 within the top side 11 of the horizontal bar and into the lateral side 15 facing the shelf member 3. The extension of the slot 14 within the top side 11 is smaller than the width of the top side 11 and the extension of the slot 14 within the lateral side 15 facing the shelf member 3 is smaller than the height of the lateral side 15. In this manner, a weakening of the stiffness of the horizontal bar 2 by the slot 14 is substantially prevented.

The slots 14 are uniformly spaced within the two horizontal bars 2A, 2B. Furthermore, corresponding slots are provided in the two horizontal bars are exactly aligned with one another. When, as indicated in FIGS. 2, 3A, and 3B, the shelf member 3 is placed from above onto the horizontal bars, the respective opposed end 16 of the side portion 8 and of the bent section 9 will be received in the slots 14. The greatest spacing between two corresponding slots 14 is slightly greater than the length of the side portion 8 and of the bent section 9 in the longitudinal direction of the shelf member. Furthermore, the width of each slot 14 is dimensioned such that the side portion 8 and the bent section 9, bent at an angle of almost 180° relative to the side portion 8, can be inserted with slight resistance from above into the slot.

The opposed ends 16 thus serve as the securing elements of the shelf member 3. In order to ensure snapping of the securing elements into the slot 14, the slot 14 may be embodied as shown in FIG. 4. According to this embodiment, the slot portion of the slot 14 extending within the lateral side 15 has an upper end which is narrow and a lower end 18 which is wider than the upper end. The wider lower end 18 is somewhat longer than the height of the bent section 9. In this manner, the spring element provided by the bent section 9 is inserted from above into the horizontal bar 2 and can snap into the widened lower end 18. According to FIG. 4, the width of the slot 14 is such that optionally it is possible to insert two neighboring shelf members 3 with their side portions 8 and spring-element 9 into the same slot 14.

For providing a smooth support surface for the plastic containers, the shelf member 3 in the embodiment according to FIG. 3A extends to the forward edge of the horizontal bar 2A. The shelf member 3 is provided with horizontal and vertical guide projections 19 extending at a slant. They can be produced in a simple manner during cutting and stamping of the sheet metal steel when producing the shelf member 3. Additional manufacturing steps are not required for producing the slanted guide projections 19.

In the variant shown in FIG. 3B, the shelf member 3 projects thus to the forward edge of the horizontal bar 2A. For increasing the stiffness in this area, the side portion 8 and the bent section 9 of the shelf member are provided within this extended portion.

The specification incorporates by reference the disclosure of EP 971 08 859.6 of Jun. 3, 1997.

The present invention is, of course, in no way restricted to the specific disclosure of the specification and drawings, but also encompasses any modifications within the scope of the appended claims.

What is claimed is:

1. A storage shelf system comprising:

vertical supports;

spaced-apart, parallel horizontal bars connecting said vertical supports;

horizontal shelf members extending perpendicularly to said horizontal bars and each having first and second end portions, wherein said horizontal shelf members are fastened by said first and second end portions to said spaced-apart, parallel horizontal bars;

said horizontal shelf members each having a length in a direction of a depth of said shelf system;

said horizontal shelf members having smooth, continuous support surfaces for supporting goods stored in said shelf system;

said support surfaces each having a length identical to said length of said horizontal shelf members;

each one of said horizontal bars having a top side and cutouts extending in said top side in said direction of depth of said shelf system;

said horizontal shelf members having securing elements engaging said cutouts to connect said horizontal shelf members to said horizontal bars;

wherein said horizontal shelf members are unitary profiled members having side portions extending downwardly and in said direction of depth of said shelf system, wherein said securing elements comprise bent portions of said side portions;

said first and second end portions having free ends without said side portions such that said free ends project past said cutouts and rest face-to-face on said top side of said horizontal bars, wherein said cutouts extend in said top side of said horizontal bars and in vertical sides of said horizontal bars facing said horizontal shelf members.

2. A shelf system according to claim 1, wherein said cutouts are slots extending perpendicularly to a length of said horizontal bars.

3. A shelf system according to claim 2, wherein said horizontal bars include edges formed by intersections of said top sides and vertical sides, said slots extending from said top sides through said edges and into said vertical sides, wherein a length of each of said slots in said top sides is less than a width of each of said top sides and wherein a length of each of said slots in said vertical sides is less than a height of each of said vertical sides.

4. A shelf system according to claim 3, wherein portions of said slots extending within said vertical sides have upper ends and lower ends, wherein each of said lower ends is wider than each of said upper ends, wherein said bent portions comprise spring elements that snap into said lower ends to secure said horizontal shelf members to said horizontal bars.

5. A shelf system according to claim 1, wherein said bent portions comprise upwardly bent sections forming spring elements.

6. A shelf system according to claim 1, wherein said side portions form longitudinal edges of said horizontal shelf members and increase bending and torsional stiffness of said horizontal shelf members.

7. A shelf system according to claim 1, wherein at least one of said end portions of said horizontal shelf members has slanted guide projections.

* * * * *